(12) United States Patent
Miyatake et al.

(10) Patent No.: US 6,683,717 B1
(45) Date of Patent: Jan. 27, 2004

(54) NEUTRAL POLARIZER AND LIQUID CRYSTAL DISPLAY

(75) Inventors: Minoru Miyatake, Osaka (JP); Takafumi Sakuramoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/558,324

(22) Filed: Apr. 26, 2000

(30) Foreign Application Priority Data

Apr. 26, 1999 (JP) ............................................. 11-117549
Mar. 16, 2000 (JP) ....................................... 2000-073212

(51) Int. Cl.[7] .............................. G02B 5/02; G02B 5/30; G02B 27/28; G02F 1/1335; C09K 19/02
(52) U.S. Cl. ....................... 359/490; 359/492; 359/494; 359/500; 359/599; 349/64; 349/65; 349/96; 349/183; 349/186; 362/19; 362/31; 362/558; 362/561
(58) Field of Search ................................. 359/487, 490, 359/491, 492, 494, 495, 500, 599; 349/96, 112, 183, 186, 61, 64, 65, 69, 70; 362/19, 31, 558, 661

(56) References Cited

U.S. PATENT DOCUMENTS

| | | | |
|---|---|---|---|
| 2,123,902 A | | 7/1938 | Land .............................. 88/1 |
| 3,848,965 A | * | 11/1974 | Adams, Jr. et al. |
| 4,088,400 A | * | 5/1978 | Assouline et al. |
| 4,688,901 A | * | 8/1987 | Albert |
| 5,048,932 A | * | 9/1991 | Yamamoto et al. |
| 5,204,763 A | * | 4/1993 | Hikmet |
| 5,686,979 A | * | 11/1997 | Weber et al. |
| 5,721,603 A | * | 2/1998 | De Vaan et al. |
| 5,751,388 A | | 5/1998 | Larson ........................ 349/96 |
| 5,769,393 A | * | 6/1998 | Kobayashi et al. |
| 5,825,444 A | * | 10/1998 | Broer et al. |
| 5,825,543 A | | 10/1998 | Ouderkirk et al. .......... 359/494 |
| 5,891,357 A | * | 4/1999 | Akashi et al. |
| 5,940,211 A | * | 8/1999 | Hikmet et al. |
| 6,016,177 A | * | 1/2000 | Motomura et al. |
| 6,096,375 A | * | 8/2000 | Ouderkirk et al. |
| 6,111,696 A | * | 8/2000 | Allen et al. |
| 6,124,971 A | * | 9/2000 | Ouderkirk et al. |
| 6,175,399 B1 | * | 1/2001 | Mitsui et al. |
| 6,211,933 B1 | * | 4/2001 | Mizunuma et al. |
| 6,236,439 B1 | * | 5/2001 | Saiki et al. |
| 6,259,496 B1 | * | 7/2001 | Kashima |
| 6,295,108 B1 | * | 9/2001 | Kaneko |
| 6,361,838 B1 | * | 3/2002 | Miyatake et al. |
| 6,369,945 B1 | * | 4/2002 | Sakuramoto et al. |
| 6,392,802 B2 | * | 5/2002 | Miyatake et al. |

FOREIGN PATENT DOCUMENTS

JP          9-274108       10/1997    ............ G02B/5/30

* cited by examiner

*Primary Examiner*—Ricky D. Shafer
(74) *Attorney, Agent, or Firm*—Sughrue Mion, PLLC

(57) ABSTRACT

A neutral polarizer has a dichroic polarizing sheet and a polarizing and scattering sheet laminated on the dichroic polarizing sheet. The polarizing and scattering sheet has anisotropy in light scattering properties depending on a direction of polarization, and has an optical axis showing intense scattering properties. Scattering intensity of linearly polarized light having a polarization direction of the optical axis is greatly dependent on wavelength. An absorption axis of the dichroic polarizing sheet and the optical axis of the polarizing and scattering sheet are in parallel to each other. A liquid crystal display is provided so that this neutral polarizer is disposed on a light source side of a liquid crystal panel.

11 Claims, 2 Drawing Sheets

NEUTRAL POLARIZER AND LIQUID CRYSTAL DISPLAY

BACKGROUND OF THE INVENTION

1. Field of the Invention

This invention relates to a neutral polarizer which provides linearly polarized light with excellent tone and is useful to improve visibility of a liquid crystal display, and the like.

The present application is based on Japanese Patent Application No. Hei. 11-117549 and 2000-73212, which are incorporated herein by reference.

2. Description of the Related Art

Dichroic polarizers having a dichroic substance, such as iodine, Herapathit, or a dichroic dye, adsorbed and orientated on a substrate are known. These polarizers are to obtain linearly polarized light by making use of light absorption by the dichroic substance and have been frequently used in liquid crystal displays, etc. However, the degree of polarization is dependent on wavelength, showing some scatter in the visible region. In general, the polarization degree of polarized light having a wavelength around 400 nm, which is close to the ultraviolet region, tends to be low.

The wavelength dependence of polarization degree causes leakage of light when the dichroic polarizers are arranged in a crossed-Nicol. It follows that, where the dichroic polarizers in a crossed-Nicol are used in a liquid crystal display to make a dark image, the black screen gets blue-tinged, or a full-color image suffers from color mixing due to blue deficiency in black areas, resulting in reduced color reproducibility. Where the concentration of adsorbed dichroic substance that absorbs light in the shorter wavelength region is increased to increase the light absorption thereby to reduce light leaks, the white display image is yellowed because shorter wavelength light is absorbed more than longer wavelength light, also resulting in reduction of color reproducibility.

SUMMARY OF THE INVENTION

Accordingly, an object of the present invention is to provide a polarizer which provides transmitted polarized light whose polarization degree shows reduced wavelength dependence.

Another object of the present invention is to provide a liquid crystal display having minimized color deficiency and excellent achromaticity and therefore exhibits improved visibility with excellent color reproducibility in both a black and a white display mode.

The present invention provides a neutral polarizer which comprises a dichroic polarizing sheet and a polarizing and scattering sheet which has anisotropy in light scattering properties depending on the direction of polarization in such a manner as to have an optical axis in which linearly polarized light is scattered most intensely and that the scattering intensity of the linearly polarized light of that optical axis shows strong wavelength dependence, the absorption axis of the dichroic polarizing sheet and the optical axis of the polarizing and scattering sheet in which linearly polarized light is scattered most intensely being in parallel to each other.

The present invention also provides a liquid crystal display having the above-described neutral polarizer as a polarizer on the light source side of a liquid crystal display panel.

In the neutral polarizer according to the present invention, the optical axis of the polarizing and scattering sheet in which linearly polarized light is transmitted efficiently (the direction in which linearly polarized light is hardly scattered) and the transmission axis of the dichroic polarizing sheet agree with each other. As a result, the neutral polarizer exhibits excellent transmitting properties in that axial direction to satisfactorily maintains the hue ascribed to the dichroic polarizing sheet. Further, in the optic axial direction of the polarizing and scattering sheet which agrees with the absorption axis of the dichroic polarizing sheet, linearly polarized light is scattered intensely, and the intensity of the scattering in this direction has great dependence on wavelength, so that the transmittance for light, particularly in the shorter wavelength side, is reduced. As a result, leakage of light in the shorter wavelength side attributed to the dichroic polarizing sheet can be suppressed thereby to make the light achromatic, whereby the polarized light in both of the above-described optic axes can be made achromatic.

Thus, polarized light having been transmitted through the neutral polarizer has reduced wavelength dependence of polarization degree. It follows that a crossed-Nicol of the neutral polarizers hardly causes light leakage, the image in a black display mode is prevented from getting chromatic, color mixing due to color deficiency in a full-color display mode is prevented, and yellowing of a white image due to the difference in absorption dependent on wavelength is prevented. As a result, there are provided a liquid crystal display and the like which have satisfactory color reproducibility and satisfactory visibility. Where the neutral polarizer is disposed on the light source side of a liquid crystal display panel, hindrance to visibility attributed to back scatter by the polarizing and scattering sheet can be avoided thereby securing the improvement on visibility, such as contrast. Additionally, the neutral polarizer of the invention can be produced efficiently simply by superposing the constituent layers on each other and is suited to mass production.

Features and advantages of the invention will be evident from the following detailed description of the preferred embodiments described in conjunction with the attached drawings.

DETAILED DESCRIPTION OF THE PREFERRED EMBODIMENTS

Figure 1:
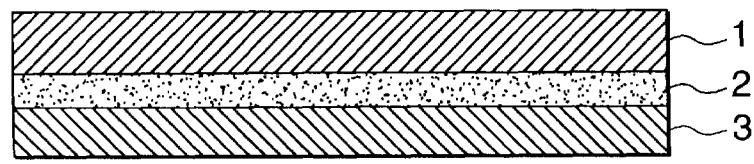
FIG. 1 is a cross-sectional view of an example of the neutral polarizer according to the present invention.
Figure 2:
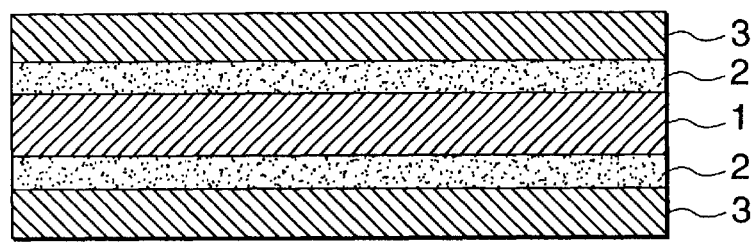
FIG. 2 is a cross-sectional view of another example of the neutral polarizer according to the invention.

The neutral polarizer according to the present invention comprises a dichroic polarizing sheet and a polarizing and scattering sheet which has anisotropy in scattering properties depending on the polarization direction in such a manner that it has an optical axis showing intense scattering properties and that the scattering intensity of linearly polarized light having a polarization direction of that optical axis exhibits strong wavelength dependence. The absorption axis of the dichroic polarizing sheet and the optical axis of the polarizing and scattering sheet showing intense scattering properties are in parallel to each other. Examples of the neutral polarizer are shown in FIGS. 1 and 2, in which numerals 1, 2 and 3 indicate a dichroic polarizing sheet, an adhesive layer that is provided if desired, and a polarizing and scattering sheet.

The dichroic polarizing sheet is selected appropriately from those having a transmission axis and an absorption axis for linearly polarized light. Useful dichroic polarizing sheets include stretched films of hydrophilic polymers, such as polyvinyl alcohol, polyvinyl alcohol partially formal, and a partially saponified ethylene-vinyl acetate copolymer, having adsorbed a dichroic substance such as iodine or a dichroic dye, and orientated films of polyenes, such as dehydrated polyvinyl alcohol or dehydrochlorinated polyvinyl chloride.

The dichroic polarizing sheet may have a transparent protective layer on one or both sides thereof for protection against heat, humidity, etc. The transparent protective layer is formed of, for example, transparent polymers, particularly polymers excellent in transparency, mechanical strength, heat stability, and moisture barrier properties.

The transparent polymers which can be used as a protective layer include cellulosic polymers, such as cellulose diacetate and cellulose triacetate; olefinic polymers, such as polyethylene, polypropylene, polyolefins having a cyclo- or norbornene structure, and ethylene-propylene copolymers; acrylic polymers, such as polymethyl methacrylate; polyesters, such as polyethylene terephthalate and polyethylene naphthalate; styrene polymers, such as polystyrene and acrylonitrile-styrene copolymers (AS polymers); and polyamides, such as nylon and aromatic polyamides.

Also included in the transparent polymers are polycarbonates, vinyl chloride polymers, polyimides, polysulfone, polyether sulfone, polyether ether ketone, polyphenylene sulfide, vinyl alcohol polymers, vinylidene chloride polymers, vinyl butyral polymers, polyarylates, polyoxymethylene, silicone polymers, urethane polymers, polyethers, vinyl acetate polymers, polyblends comprising these polymers, and heat- or UV-curing polymers of phenol type, melamine type, acrylic type, urethane type, urethane acrylate type, epoxy type or silicone type.

The transparent protective layer can be formed by a convenient method such as coating with a transparent polymer or laminating with a dry film. Into the transparent protective layer may be incorporated transparent particles having an average particle size of 0.5 to 50 $\mu$m to give surface roughness for light diffusing properties. The particles can be of inorganic substances which may have electrical conductivity, such as silica, alumina, titania, zirconia, tin oxide, indium oxide, cadmium oxide, and antimony oxide; or organic substances, such as crosslinked or non-crosslinked polymers.

The polarizing and scattering sheet may serve as the above-described transparent protective layer. In this case, the polarizing and scattering sheet may be provided on both sides of the polarizing sheet. From the standpoint of improving image brightness and contrast, the dichroic polarizing sheet to be used is preferably a film having a high light transmittance and a high polarization degree such as the above-described film containing a dichroic substance, particularly a film having a light transmittance of 40% or more and a polarization degree of 95% or more.

On the other hand, the polarizing and scattering sheet is selected appropriately from those which show anisotropy in light scattering properties depending on the direction of polarization in such a manner that the scattering intensity of linearly polarized light in the direction of the optical axis showing intense scattering properties is greatly dependent on wavelength. Such a polarizing and scattering sheet preferably includes a transparent film having dispersed therein fine birefringent domains having different refractive index characteristics from the other portion (matrix) and having an optical axis which exhibits the maximum transmittance for linearly polarized light and another optical axis which is perpendicular to the first-mentioned optical axis in which linearly polarized light is scattered intensely (see Japanese Patent Publication No. Hei. 9-274108).

From the standpoint of suppressing the wavelength dependence of the polarization degree, suppressing light leakage in crossed-Nicol, and obtaining a high light transmittance, the polarizing and scattering sheet preferably has the following scattering anisotropy. When linearly polarized light whose direction of polarization is the optical axis showing the maximum transmission for linearly polarized light (i.e., the optical axis showing the weakest scattering properties, hereinafter referred to as a $\Delta n2$ direction) or the optical axis which is perpendicular to the $\Delta n2$ direction and shows the most intense scattering properties for linearly polarized light (hereinafter referred to as a $\Delta n1$ direction), the ratio of the diffused transmittance in the $\Delta n2$ direction to that in the $\Delta n1$ direction is preferably 2 or more, still preferably 3 or more, particularly preferably 5 or more.

For securing the brightness ascribed to the transmission of polarized light in the $\Delta n2$ direction and for maintaining the tone ascribed to the dichroic polarizing sheet in the neutral polarizer, it is preferred for the polarizing and scattering sheet to have as high a linearly polarized light transmittance in the $\Delta n2$ direction as possible, particularly to have a total light transmittance of 80% or more, especially 90% or more. Further, while depending on the kind of the dichroic polarizing sheet to be combined with, it is generally preferred for the tone in a white display mode that the wavelength dependence of the transmission spectrum of the polarized light in the $\Delta n2$ direction be as small as possible. More specifically, it is preferred that the difference between the transmittance of the $\Delta n2$ direction for linearly polarized light having a wavelength of 430 nm and that for linearly polarized light having a wavelength of 610 nm be 5% or less. These wavelengths correspond to the peak wavelengths of a three-wavelength tube used in a backlight. Therefore, where the wavelength characteristics of a light source are varied, the above wavelengths, on which wavelength dependence of transmission is evaluated, are preferably in conformity to the peak wavelengths of the light source.

In order to obtain achromatic polarized light of the $\Delta n1$ direction (the optical axis showing intense scattering properties) from the neutral polarizer, and in order for the linearly polarized light of the $\Delta n1$ direction to have strong wavelength dependence of scattering intensity particularly to prevent bluing in a black display mode, it is preferred that the polarizing and scattering sheet has such wavelength dependence that it scatters light of shorter wavelength side thereby to reduce the transmittance more than light of longer wavelength side in the visible region. Accordingly, it is preferable to use a scattering and polarizing sheet showing such wavelength dependence of scattering as to compensate for the wavelength dependence of the dichroic polarizing sheet.

Noting linearly polarized light having a wavelength of 430 nm and 610 nm as referred to above, it is preferred that the transmittance for linearly polarized light at 430 nm in the Δn1 direction is 90% or less, particularly 85% or less, especially 80% or less, of that for linearly polarized light at 610 nm in the Δn1 direction. The absolute values of the above-mentioned transmittances depend on the intensity of scattering. The lower the transmittances, the lower the quantity of transmitted light in a black display mode, from which a high contrast display could be expected. In general, the transmittance, etc. are adjusted in view of the balance between the transmittance of polarized light in the Δn2 direction (transmission axis) and the scattering intensity in the Δn1 direction (absorption axis) of the polarizing and scattering sheet.

The wavelength dependence of the scattering intensity can be adjusted by, for example, controlling the size of the aforementioned fine domains. Where the fine domains are small enough with respect to the wavelength ($\lambda$), the scattering intensity is proportional to $1/\lambda^4$ to a good approximation to Rayleigh scattering. It follows that light of the shorter wavelength side can be scattered intensely. Where the size of the fine domains is close to the wavelength, unique wavelength dependence will be exhibited due to, for example, the difference in refractive index between the fine domains and the other portion.

From these considerations, it is usually preferred that the fine domains have an average length of 0.1 to 10 μm in the Δn1 direction.

The polarizing and scattering sheet with the above-described scattering anisotropy is obtained by, for example, producing a difference of 0.03 or greater in refractive index (Δn1) in the Δn1 direction between the fine domains and the other portion while making a difference in refractive index (Δn2) in the Δn2 direction between the fine domains and the other portion as small as possible, particularly 80% or smaller of the above difference (Δn1). Accordingly, it is desirable for the Δn2 to be as close as possible to zero. In other words, it is desirable that the refractive index in the Δn2 direction in the fine domains and that in the other portion be practically equal.

The scattering anisotropy of the polarizing and scattering sheet is ascribed to the above-described refractive index differences, Δn1 and Δn2. The polarizing and scattering sheet having such characteristics can be formed by, for example, orientating (for example, by stretching) a film comprising an appropriate combination of transparent materials, such as polymers and liquid crystals, which are selected so as to form domains different from the other portion in birefringence characteristics. For example, a combination of a polymer(s) and a liquid crystal compound(s), a combination of an isotropic polymer(s) and an anisotropic polymer(s), or a combination of anisotropic polymers can be used. A combination of materials which undergo phase separation is preferred in view of dispersibility of fine domains. The dispersibility of fine domains can be controlled by the miscibility of the materials combined. Phase separation can be induced by, for example, dissolving immiscible materials in a solvent or mixing immiscible materials by heat-melting.

Where a combination of materials is orientated by stretching, a combination of a polymer and a liquid crystal compound or a combination of an isotropic polymer and an anisotropic polymer is stretched at an arbitrary stretching temperature at an arbitrary strecthing ratio, or a combination of anisotropic polymers is stretched under properly controlled stretching conditions, thereby to form a desired polarizing and scattering sheet. While anisotropic polymers are divided into the positive and the negative according to the change of refractive index in the stretching direction, both anisotropic polymers, either positive or negative, can be used in the present invention. For example, positively or negatively anisotropic polymers may be combined, or a positively anisotropic polymer and a negatively anisotropic polymer may be combined.

Useful polymers include the transparent polymers previously enumerated as a material of the transparent protective layer. Useful liquid crystals include low-molecular weight liquid crystal compounds or crosslinking liquid crystal monomers which exhibit a nematic phase or a smectic phase at room temperature or high temperature, such as cyanobiphenyl compounds, cyanophenylcyclohexane compounds, cyanophenyl ester compounds, phenyl benzoate compounds, phenylpyrimidine compounds, and mixtures thereof; and liquid crystal polymers showing a nematic phase or a smectic phase at room temperature or high temperature. The crosslinking liquid crystal monomers are usually subjected to orientation followed by crosslinking by an appropriate means such as heat or light to become polymers.

For obtaining a polarizing and scattering sheet excellent in heat resistance and durability, it is preferred to use a transparent film-forming polymer whose glass transition temperature (hereinafter "Tg") is 50° C. or higher, particularly 80° C. or higher, especially those having a glass transition temperature of 110° C. or higher and a heat distortion temperature of 80° C. or higher, in combination with a crosslinking liquid crystal monomer or a liquid crystal polymer. The liquid crystal polymers to be used are not particularly limited and can be selected appropriately from main chain types, side chain types, and the like. Liquid crystal polymers having a degree of polymerization of 8 or more, preferably 10 or more, still preferably 15 to 5000, are preferred from the standpoint of capability of forming fine domains with excellent uniformity of particle size distribution, thermal stability, film forming properties, ease of orientation treatment, and the like.

The polarizing and scattering sheet comprising a liquid crystal polymer is formed by, for example, mixing one or more of polymers and one or more liquid crystal polymers for making fine domains, molding the mixture into a film having the liquid crystal polymer(s) finely dispersed in the form of fine domains, and orientating the film by an appropriate method to form domains different in birefringence characteristics from the matrix polymer.

In view of controllability on the refractive index differences Δn1 and Δn2 by an orientation treatment, it is preferred to use liquid crystal polymers which have a Tg of 50° C. or higher and exhibit a nematic liquid crystal phase in a temperature range lower than the Tg of the polymers used in combination. Such liquid crystal polymers can include side chain type liquid crystal polymers comprising a monomer unit represented by formula:

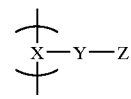

In the above formula, X is a skeleton group forming the main chain of the liquid crystal polymer, which is linked to form a linear chain, a branched chain, a cyclic chain, etc. Examples of polymers as X include polyacrylates, polymethacrylates, poly-α-haloacrylates, poly-α-cyanoacrylates, polyacrylamides, polyacrylonitriles, polymethacrylonitriles, polyamides, polyesters, polyurethanes, polyethers, polyimides, and polysiloxanes.

Y is a spacer group branching off the main chain. Spacer groups Y which are preferred for ease of forming a polarizing and scattering sheet (such as refractive index controllability) include ethylene, propylene, butylene, pentylene, hexylene, octylene, decylene, undecylene, dodecylene, octadecylene, ethoxyethylene, and methoxybutylene groups.

Z is a mesogen group contributory to nematic orientation. Suitable mesogen groups are shown below.

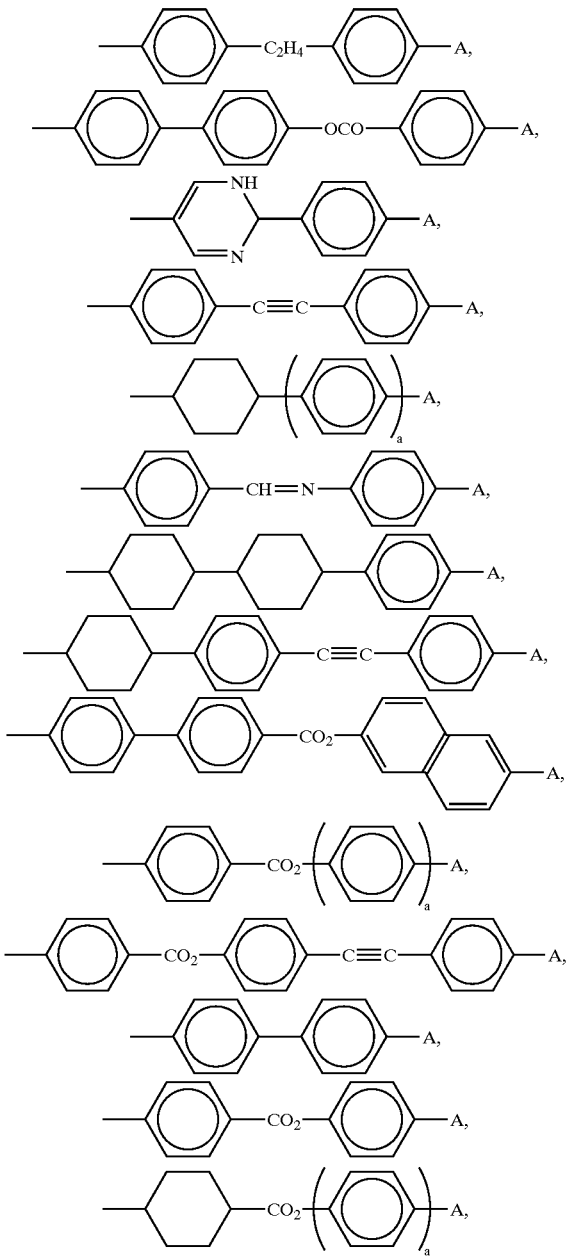

In the above formulae, the end group A can include a cyano group, an alkyl group, an alkenyl group, an alkoxy group, an oxyalkyl group, and an alkyl, alkoxy or alkenyl group having at least one hydrogen atom substituted with fluorine or chlorine.

The spacer group Y and the mesogen group Z may be linked via an ether linkage (—O—). The phenyl group in the mesogen group Z may have its one or two hydrogen atoms substituted with halogen, preferably chlorine or fluorine.

The side-chain type liquid crystal polymers having nematic orientation properties can include thermoplastic polymers, such as homopolymers or copolymers comprising the above-described monomer unit. Those excellent in monodomain orientation properties are particularly preferred.

The polarizing and scattering sheet comprising the above-described liquid crystal polymers having nematic orientation properties is obtained, for example, as follows. One or more film-forming polymers, preferably those having a heat distortion temperature of 80° C. or higher and a Tg of 110° C. or higher, and one or more liquid crystal polymers which have a Tg of 50° C. or higher (preferably 60° C. or higher, particularly 70° C. or higher) and exhibit a nematic phase in a temperature range lower than the Tg of the film-forming polymers are mixed and molded into a polymer film having the liquid crystal polymer(s) dispersed therein in the form of fine domains, heating the film to orientate the liquid crystal polymer(s) forming the fine domains in a nematic phase, and fixing the orientation by cooling.

The polymer film having fine domains dispersed therein can be formed by a convenient method, such as film casting, extrusion, injection molding, and calendering. The polymer film may also be formed by once spreading a monomer mixture into film, which is then polymerized by heating or irradiation with ultraviolet light, etc.

For obtaining a polarizing and scattering sheet having the fine domains uniformly distributed, the polymer film to be orientated is preferably formed by casting a solution of the polymers in a solvent followed by drying. The size and distribution of the fine domains can be controlled by the choice of the solvent used, the viscosity of the solution, the drying rate of the cast film, and the like. For example, reduction of the viscosity of the polymer solution or increase of the drying rate is advantageous for reducing the area of the fine domains.

The thickness of the polymer film to be orientated is decided appropriately according to desired wavelength dependence of scattering, and the like. Taking ease of orientation, etc. into consideration, the thickness is preferably 1 μm to 3 μm, still preferably 5 μm to 1 μm, particularly preferably 10 to 500 μm. The film-forming mixture can contain various additives, such as a dispersant, a surface active agent, an ultraviolet absorber, a tone regulator, a flame retardant, a parting agent, and an antioxidant.

Orientation of the film can be carried out by any one or more methods of orientation by which refractive indices are controllable. Such methods include stretching (uniaxial stretching, biaxial stretching, successive biaxial stretching, Z-axis stretching, etc.), calendering, a method comprising applying an electric field or a magnetic field to the film at or above a Tg or at or above a liquid crystal transition temperature and quenching the film to fix the orientation, a method in which orientation is induced while the flowable film-forming material is made into film, and a method in which liquid crystals are let to self-orientate based on the slight orientation of an isotropic polymer. That is, the polarizing and scattering sheet may be either a stretched film or a unstretched film. For use in stretched films, polymers having excellent ductility are preferred. Brittle polymers are also employable, though.

Where the fine domains are made of the aforementioned liquid crystal polymers, orientation can also be effected by a method comprising melting the liquid crystal polymer dispersed as fine domains at a temperature at which it assumes the objective liquid crystal phase, e.g., a nematic phase and orientating the liquid crystal polymer under the action of an orientation regulating force, followed by quenching to fix the orientated state. In order to prevent variations in optical characteristics, the aligned state of the fine domains is preferably monodomain orientation.

The orientation regulating force as referred to above is a force capable of orientating liquid crystal polymers, including the stretching force in stretching the polymer film at an appropriate draw ratio, the shearing force in film formation, an electric field, and a magnetic field. These forces can be used either individually or as a combination thereof.

The portion other than the fine domains in the polarizing and scattering sheet may be either birefringent or isotropic. The polarizing and scattering sheet exhibiting birefringence as a whole is prepared by using a film-forming polymer exhibiting birefringence upon orientation and inducing molecular orientation during the above-described film forming process. If desired, a known means for orientation, such as stretching, could be added to the film to impart or control birefringence. The polarizing and scattering sheet in which the portion other than the fine domains is isotropic is prepared by, for example, using an isotropic film-forming polymer and stretching the resulting film in a temperature range below the Tg of the film-forming polymer.

As stated above, the preferred polarizing and scattering sheet has such refractive index characteristics that: the difference in refractive index between the fine domains and the other portion (i.e., the portion comprising the polymer film) is 0.03 or greater in the optical axis that scatters linearly polarized light most intensely (i.e., in the $\Delta n1$ direction which is perpendicular to the axial direction showing the maximum transmittance for linearly polarized light) ($\Delta n1 \geq 0.03$); and that the difference in the optical axis showing the maximum transmittance for linearly polarized light with the least scattering (i.e., in the $\Delta n2$ direction) is controlled to 80% or less, particularly 50% or less of $\Delta n1$ ($\Delta n2 \leq 0.8 \Delta n1$, particularly $\Delta n2 \leq 0.5 \Delta n1$). The polarizing and scattering sheet having such refractive index differences exhibits excellent scattering properties in its $\Delta n1$ direction and excellent performance in maintaining the polarized state and securing straight transmission of the polarized light in its $\Delta n2$ direction.

As described above, it is preferred for the refractive index difference $\Delta n1$ in the $\Delta n1$ direction be moderately large from the viewpoint of the scattering properties, particularly 0.035 to 1, especially 0.04 to 0.5. On the other hand, the refractive index difference $\Delta n2$ in the $\Delta n2$ direction is preferably as small as possible for maintenance of the polarized state. It is preferably smaller than 0.03, still preferably 0.02 or smaller, particularly preferably 0.01 or smaller.

Accordingly, the above-described orientation treatment for the fine domains can be regarded as an operation for increasing the refractive index difference $\Delta n1$ in the $\Delta n1$ direction and/or decreasing the refractive index difference $\Delta n2$ in the $\Delta n2$ direction by orientating the material forming the fine domains, such as liquid crystal polymers, in a given direction to as high a degree as possible.

It is preferred for the fine domains in the polarizing and scattering sheet to be dispersed and distributed as uniformly as possible for obtaining uniformity in the scattering effect, and the like. The size of the fine domains, especially the length in the scattering direction (the $\Delta n1$ direction) is dependent on the back scatter (reflection) or the wavelength dependence as described above. Therefore, the size of the fine domains, especially the length in the $\Delta n1$ direction is decided appropriately in accordance with the desired wavelength dependence of scattering intensity, and the like. In general, the average length in the $\Delta n1$ direction is 100 $\mu$m or smaller, preferably 50 $\mu$m or smaller, still preferably from 0.1 to 10 $\mu$m. The length in the $\Delta n2$ direction of the fine domains dispersed in the polarizing and scattering sheet is not particularly limited.

The proportion of the fine domains in the polarizing and scattering sheet is selected appropriately in accordance with the scattering properties in the $\Delta n1$ direction, and the like. With the film strength being taken into consideration as well, it is usually 0.1 to 70% by weight, preferably 0.5 to 50% by weight, still preferably 1 to 30% by weight.

The polarizing and scattering sheet may be a single-layer film having the above-mentioned birefringence characteristics or may be a laminate sheet composed of two or more of such films. The laminate sheet will exhibit synergism in scattering effect over summation of the thicknesses. The two or more films may be superposed with their $\Delta n1$ directions or the $\Delta n2$ directions making an arbitrary angle, but for enhancement of the scattering effect, they are preferably superposed with their $\Delta n1$ directions being parallel to each other. The number of the films to be superposed is selected appropriately.

The $\Delta n1$ or $\Delta n2$ of the two or more films to be superposed may be the same or different. While it is preferred for the upper and lower films to be as parallel as possible with reference to their $\Delta n1$ directions, etc., slight derivation from parallelism due to errors in the laminating operation is allowable. In case where the films show variation in their $\Delta n1$ direction, etc., the parallelism is to be designed based on the average directions.

While the two or more films in the laminate may be in a merely superposed state, they are preferably joined together via an adhesive layer and the like so as to prevent sliding of the optic axes, such as the $\Delta n1$ direction, and to prevent foreign matter from entering each interface between the films. An appropriate adhesive of hot-melt type, pressure-sensitive type, etc. can be used. In order to suppress a reflection loss due to the adhesive layer, it is preferred that the difference in refractive index between the adhesive layer and the adherend films be as small as possible. Such a difference in refractive index could be minimized by using the same polymer as the polymer constituting the film matrix or the fine domains.

The neutral polarizer according to the present invention is a laminate of the dichroic polarizing sheet and the polarizing and scattering sheet with the absorption axis of the former and the optical axis of the latter which exhibits intense scattering properties (the $\Delta n1$ direction) being in parallel to each other. As shown in FIG. 2, the polarizing and scattering sheet 3 may be provided on each side of the dichroic polarizing sheet 1. The above-described parallelism between the films making up the laminated polarizing and scattering sheet applies to the relationship between the dichroic polarizing sheet 1 and the polarizing and scattering sheet 3 and also to the relationship between the two polarizing and scattering sheets 3, 3 provided on each side of the dichroic polarizing sheet 1. Where the dichroic polarizing sheet and the polarizing and scattering sheet are formed by stretching, the absorption axis of the former and the $\Delta n1$ direction of the latter usually agree with the stretching direction. In such cases, the films can be subjected to laminating while being stretched by means of rolls thereby to produce the neutral polarizer of the invention in a continuous manner with good efficiency.

In the practical use of the neutral polarizer of the invention, it may be laminated with necessary optical elements, such as a phase retarder. The optical element may be simply superposed on the neutral polarizer or may be adhered to the neutral polarizer via an adhesive layer, etc. The same adhesives as could be used for producing the laminated polarizing and scattering sheet can be used.

The optical elements which can be combined with the neutral polarizer of the present invention can include, but are not limited to, a phase retarder, a backlighting scheme (e.g., a light pipe), a beam splitter composed of a reflective coating or a multilayered coating, a liquid crystal cell, and so forth. The optical elements to be combined, such as a phase retarder, can be of various types. For example, phase retarders which can be used in combination include a quarter retarder, a half retarder, a phase retarder of uniaxially or biaxially orientated film type, a phase retarder which is orientated not only uniaxially or biaxially but in the thickness direction to have tilted orientation, a phase retarder of liquid crystal polymer type, a phase retarder for compensating for the phase difference due to an angle of vision or birefringence, and a laminate of these types of phase retarders.

More specifically, the useful phase retarders include stretched films comprising transparent polymers, such as those described above for use in the transparent protective layer, the polarizing and scattering sheet, etc. and films comprising liquid crystalline polymers, particularly those showing twisted orientation.

The light pipes 6 include a transparent resin plate having on one edge thereof a light source 5, such as a linear light source (e.g., a cold or hot cathode fluorescent tube), a light-emitting diode, an electroluminescent device, etc., so that the light of the light source may be transmitted through the resin plate and emitted form one side of the plate through diffusion, reflection, diffraction interference, etc. See, for example, FIGS. 4 and 5.

In making a neutral polarizer having a light guide, auxiliary means, such as a prism array comprising a prism sheet for controlling the light emission direction, a diffuser for obtaining uniform light emission, and a light source holder for guiding the light emitted from the linear source to the side of the light pipe, are provided in a layer or, if necessary, two or more layers, on predetermined positions, e.g., on the upper and lower edges or the side of the light guiding plate.

In making the laminate containing the neutral polarizer, one or more than one optical elements can be used. Two or more layers of the same optical element, such as a phase retarder, may be provided. The two or more layers of an optical element (e.g., a phase retarder) may have the same or different optical characteristics. The optical elements are disposed at appropriate positions either inside or outside the laminate.

The neutral polarizer and its laminate could be produced by successively superposing separately prepared constituent layers in a predetermined order in the production line of, for instance, liquid crystal displays, but it is desirable for the constituent layers be previously joined to form a unitary laminate as described above for quality control and for improved efficiency in laminating. If desired, each layer constituting the neutral polarizer or the laminate thereof can contain an ultraviolet absorber, such as salicylic ester compounds, benzophenol compounds, benzotriazole compounds, cyanoacrylate compounds, and nickel complex salts.

Figure 4:
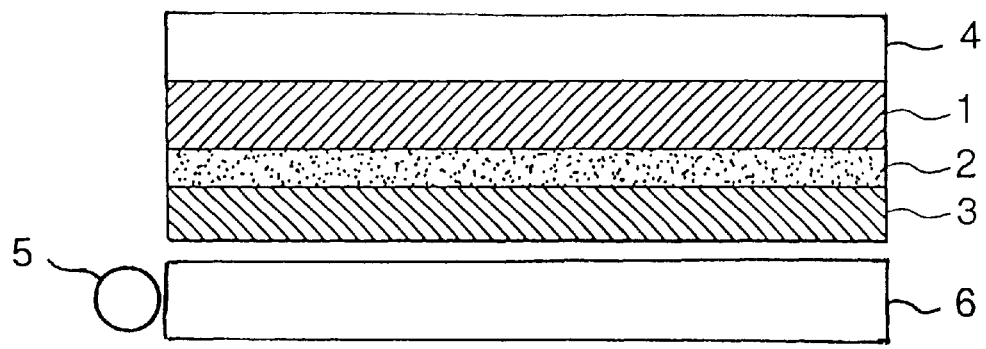
FIG. 4 is a schematic representation of an example of the neutral polarizer as shown in FIG. 1 in combination with a liquid crystal display.
Figure 5:
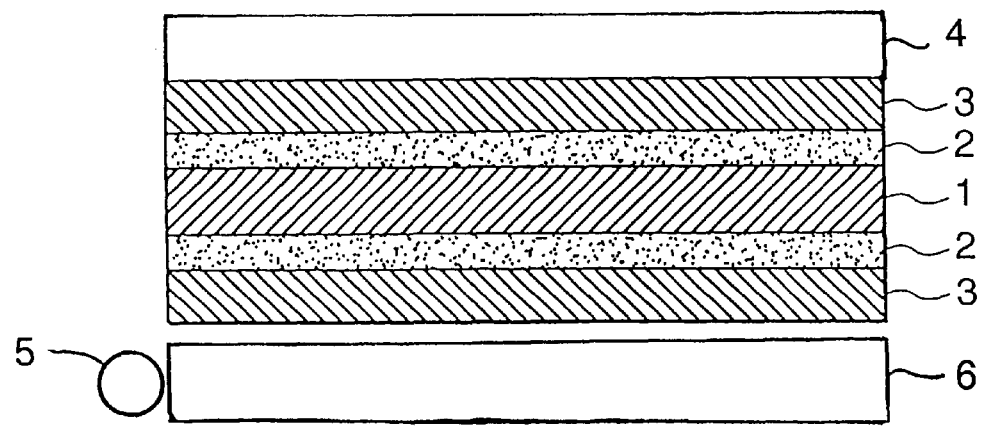
FIG. 5. is a schematic representation of an example of the neutral polarizer as shown in FIG. 2 in combination with a liquid crystal display.

The neutral polarizer according to the invention can be used in applications in conformity to conventional ones, such as production of liquid crystal displays as shown in FIGS. 4 and 5, taking advantage of the above-described characteristics. In producing liquid crystal displays, for example, the neutral polarizer of the invention can be applied to any appropriate type of a liquid crystal display panel 4. While the position of arranging the neutral polarizer in liquid crystal displays is not limited, it is desirable disposed on the rear side of the liquid crystal panel as a polarizer rather than on the front side (vision side) so as to avoid hindrance to visibility attributed to back scatter by the polarizing and scattering sheet.

EXAMPLE 1

A mixture of 950 parts by weight of a norbornene resin having a Tg of 182° C. (Arton (RTM) available from JSR; heat distortion temperature: 165° C.) and a 20 wt % dichloromethane solution of 30 parts by weight of a liquid crystal polymer represented by formula:

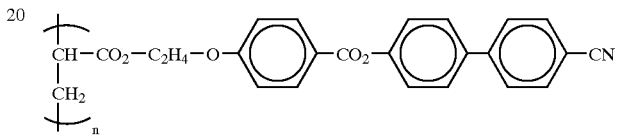

having a Tg of 80° C. and a nematic phase transition temperature of 100 to 290° C. was cast to form a polymer film having a thickness of 70 μm, which was stretched twice at 180° C., followed by quenching to obtain a polarizing and scattering film.

The resulting polarizing and scattering film was found to comprise a transparent birefringent film of the norbornene resin matrix having dispersed therein fine domains of the liquid crystal polymer. The fine domains were of substantially the same shape with their major axis in parallel with the stretching direction. The $\Delta n1$ and $\Delta n2$ of the film were 0.230 and 0.029, respectively. The liquid crystal polymer domains had an average length of 1 μm in the $\Delta n1$ direction as estimated from the coloration due to the phase difference under observation through a polarizing microscope. The diffuse transmittance of linearly polarized light was 11% in the $\Delta n1$ direction (minimum transmittance) and 67% in the $\Delta n2$ direction (maximum transmittance) as measured with a haze mater, giving a $\Delta n2$ direction to $\Delta n1$ direction transmittance ratio of 6.1. When linearly polarized light was incident on the film, the total light transmittance in the $\Delta n2$ direction was 92% as measured with an integrating sphere type spectrophotometer.

The resulting polarizing and scattering film was laminated with a dichroic polarizing sheet comprising a iodine-stained polyvinyl alcohol stretched film having a transmittance of 42% and a polarization degree of 99.7% via an acrylic pressure-sensitive adhesive layer with the $\Delta n2$ direction of the former being in parallel with the absorption axis of the latter to obtain a neutral polarizer.

EXAMPLE 2

A neutral polarizer was prepared in the same manner as in Example 1, except that the polarizing and scattering film was adhered to each side of the dichroic polarizing sheet.

EXAMPLE 3

A neutral polarizer was prepared in the same manner as in Example 1, except that two polarizing and scattering films prepared in Example 1 were superposed on the same side of the dichroic polarizing sheet.

COMPARATIVE EXAMPLE

The dichroic polarizing sheet was used alone without the polarizing and scattering film.

Figure 3:
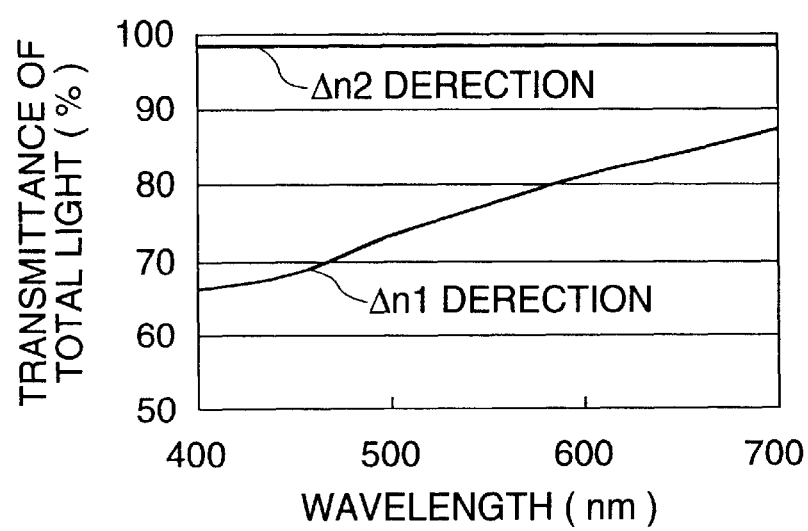
FIG. 3 is a graph showing the light transmittance characteristics of the polarizing and scattering sheet used in Examples.

Evaluation:

The total light transmittance of polarized light incident on the polarizing and scattering film used in Examples was measured with an integrating sphere type spectrophotometer. The results obtained are graphically shown in FIG. 3. It is apparent from FIG. 3 that the transmittance for linearly polarized light in the Δn1 direction exhibits significant wavelength dependence, while that in the Δn2 direction has little wavelength dependence. It is also observed that the transmittance in the Δn1 direction for linearly polarized light at 430 nm is 83% of that for linearly polarized light at 610 nm, while the difference between the transmittance in the Δn2 direction for linearly polarized light at 430 nm and that for linearly polarized light at 610 nm is less than 1%.

Further, the light transmittance of the neutral polarizers of Examples and the polarizer of Comparative Example was measured with an integrating sphere type spectrophotometer. Furthermore, two of the (neutral) polarizers were arranged in a crossed-Nicol or a parallel Nicol, and the hue was examined, which was evaluated in terms of a and b values in accordance with the Hunter's color difference formula. The results obtained are shown in Table below.

TABLE

|  | Transmission (%) | Hue of Parallel Nicol | | Hue of Crossed Nicol | |
|---|---|---|---|---|---|
|  |  | a Value | b Value | a Value | b Value |
| Example 1 | 41.9 | −3.0 | 5.0 | 0.2 | −4.3 |
| Example 2 | 41.5 | −2.9 | 4.4 | 0.1 | −2.8 |
| Example 3 | 41.5 | −2.9 | 4.4 | 0.1 | −2.8 |
| Compara. Example | 42.0 | −3.1 | 5.3 | 0.4 | −6.2 |

It is seen from Table above that the neutral polarizer of the invention is effective in improving achromaticity without being accompanied by great reduction in light transmittance. In particular, blue deficiency is markedly suppressed when the neutral polarizers are arranged in a crossed-Nicol. Further, the neutral polarizer having two polarizing and scattering sheets on a dichroic polarizer is more effective in enhancing achromaticity. From these results, it is easily recognized by one skilled in the art that the neutral polarizer according to the present invention will bring about marked improvements on color reproducibility when used in a liquid crystal display.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A neutral polarizer comprising:
   a dichroic polarizing sheet; and
   a polarizing and scattering sheet which has anisotropy in light scattering properties dependent on a direction of polarization, said polarizing and scattering sheet having an optical axis with scattering properties, a scattering intensity of linearly polarized light having a polarization direction of said optical axis being dependent on wavelength, said polarizing and scattering sheet being laminated on said dichroic polarizing sheet,
   wherein an absorption axis of said dichroic polarizing sheet and said optical axis of said polarizing and scattering sheet are in parallel to each other.

2. A neutral polarizer according to claim 1, wherein transmittance for linearly polarized light having a wavelength of 430 nm, and a polarization direction coincident with that of said optical axis of said polarizing and scattering sheet with scattering properties, is 90% or less of that for linearly polarized light having a wavelength of 610 nm and said polarization direction.

3. A neutral polarizer according to claim 1, wherein said polarizing and scattering sheet shows transmission spectral characteristics with little wavelength dependence for linearly polarized light having a polarization direction perpendicular to said optical axis of said polarizing and scattering sheet with scattering properties.

4. A neutral polarizer according to claim 1, wherein difference between transmittance for linearly polarized light having a wavelength of 430 nm and that for linearly polarized light having a wavelength of 610 nm, in a direction perpendicular to said optical axis of said polarizing and scattering sheet with scattering properties, is 5% or less.

5. A neutral polarizer according to claim 1, wherein said dichroic polarizing sheet and said polarizing and scattering sheet are joined via an adhesive layer.

6. A neutral polarizer according to claim 1, wherein said polarizing and scattering sheet also serves as a transparent protective layer on at least one side of said dichroic polarizing sheet.

7. A neutral polarizer according to claim 1, wherein said polarizing and scattering sheet has a total light transmittance of 90% or more for linearly polarized light having a polarization direction perpendicular to said optical axis of said polarizing and scattering sheet with scattering properties.

8. A neutral polarizer according to claim 1, wherein said polarizing and scattering sheet comprises a transparent polymer film having dispersed therein fine domains with birefringence characteristics different than that of a remaining portion of said polarizing and scattering sheet,
   wherein a difference in refractive index between said fine domains and said remaining portion is 0.03 to 0.5 in the direction of said optical axis, in which said linearly polarized light is scattered most intensely, and is less than 0.03 in a direction of a second optical axis that is perpendicular to said optical axis and in which said linearly polarized light is scattered most weakly, and
   said fine domains comprise a liquid crystal polymer which has a glass transition temperature of 50° C. or higher and exhibits a nematic liquid crystal phase in a temperature range lower than a glass transition temperature of polymer forming said remaining portion.

9. A neutral polarizer according to claim 8, wherein said fine domains have an average length of 0.1 to 10 μm in the direction of said optical axis, in which said linearly polarized light is scattered most intensely.

10. A neutral polarizer according to claim 8, wherein said polymer forming said remaining portion has a heat distortion temperature of 80° C. or higher and a glass transition temperature of 110° C. or higher.

11. A liquid crystal display having the neutral polarizer according to any one of claims 1 to 10 as a polarizer on a light source side of a liquid crystal panel.

* * * * *